(12) United States Patent
Cho et al.

(10) Patent No.: US 10,693,134 B2
(45) Date of Patent: Jun. 23, 2020

(54) NEGATIVE ELECTRODE ACTIVE MATERIAL FOR SECONDARY BATTERY AND METHOD FOR MANUFACTURING SAME

(71) Applicant: Nexeon Ltd., Oxfordshire (GB)

(72) Inventors: Young Tai Cho, Seo-gu Daejeon (KR); Seung Chul Park, Yuseong-gu Daejeon (KR); Seon Park, Dong-gu Daejeon (KR); Jee Hye Park, Yuseong-gu Daejeon (KR); Yong Eui Lee, Gyeonggi-do (KR); Chul Hwan Kim, Daejeon (KR); Hee Young Seo, Yuseong-gu Daejeon (KR)

(*) Notice: Subject to any disclaimer, the term of this patent is extended or adjusted under 35 U.S.C. 154(b) by 0 days.

(21) Appl. No.: 16/460,612

(22) Filed: Jul. 2, 2019

(65) Prior Publication Data

US 2019/0326594 A1  Oct. 24, 2019

Related U.S. Application Data

(63) Continuation of application No. 15/302,957, filed as application No. PCT/KR2015/003575 on Apr. 9, 2015, now Pat. No. 10,396,355.

(30) Foreign Application Priority Data

Apr. 9, 2014 (KR) .................. 10-2014-0042226

(51) Int. Cl.
*H01M 4/38* (2006.01)
*C01B 33/113* (2006.01)
(Continued)

(52) U.S. Cl.
CPC .......... *H01M 4/386* (2013.01); *C01B 33/113* (2013.01); *C01B 33/18* (2013.01); *H01M 4/049* (2013.01);
(Continued)

(58) Field of Classification Search
None
See application file for complete search history.

(56) References Cited

U.S. PATENT DOCUMENTS

| 4,002,541 A | 1/1977 | Streander |
|---|---|---|
| 4,192,720 A | 3/1980 | Bucker et al. |

(Continued)

FOREIGN PATENT DOCUMENTS

| CN | 1569623 A | 1/2005 |
|---|---|---|
| CN | 1967910 A | 5/2007 |

(Continued)

OTHER PUBLICATIONS

Abel, P. R. et al., Improving the Stability of Nanostructured Silicon Thin Film Lithium-Ion Battery Anodes through Their Controlled Oxidation, ACS Nano, 6(3):2506-2516, (2012).

(Continued)

*Primary Examiner* — Wyatt P McConnell
(74) *Attorney, Agent, or Firm* — William R. Haulbrook; Michael D. Schmitt; Choate, Hall & Stewart LLP

(57) ABSTRACT

Provided is an anode active material for a secondary battery and a method of fabricating the anode active material. A silicon-based active material composite according to an embodiment of the inventive concept includes silicon and silicon oxide obtained by oxidizing at least a part of the silicon, and an amount of oxygen with respect to a total weight of the silicon and the silicon oxide is restricted to 9 wt % to 20 wt %.

12 Claims, 1 Drawing Sheet

(51) Int. Cl.
*C01B 33/18* (2006.01)
*H01M 4/04* (2006.01)
*H01M 4/36* (2006.01)
*H01M 4/62* (2006.01)
*H01M 4/02* (2006.01)

(52) U.S. Cl.
CPC ......... *H01M 4/0471* (2013.01); *H01M 4/364* (2013.01); *H01M 4/366* (2013.01); *H01M 4/625* (2013.01); *H01M 2004/021* (2013.01)

(56) References Cited

U.S. PATENT DOCUMENTS

| | | |
|---|---|---|
| 4,363,708 A | 12/1982 | Rauchle et al. |
| 4,686,013 A | 8/1987 | Pensabene et al. |
| 5,395,711 A | 3/1995 | Tahara et al. |
| 5,514,495 A | 5/1996 | Klaus |
| 5,658,691 A | 8/1997 | Suzuki et al. |
| 5,914,183 A | 6/1999 | Canham |
| 6,132,724 A | 10/2000 | Blum |
| 6,190,951 B1 | 2/2001 | Nakahori et al. |
| 6,300,013 B1 | 10/2001 | Yamada et al. |
| 6,334,939 B1 | 1/2002 | Zhou et al. |
| 6,514,395 B2 | 2/2003 | Zhou et al. |
| 7,138,208 B2 | 11/2006 | Tanjo et al. |
| 7,244,513 B2 | 7/2007 | Li et al. |
| 7,311,999 B2 | 12/2007 | Kawase et al. |
| 7,332,339 B2 | 2/2008 | Canham |
| 7,402,829 B2 | 7/2008 | Green |
| 7,479,351 B2 | 1/2009 | Matsubara et al. |
| 7,615,206 B2 | 11/2009 | Sandhage et al. |
| 7,638,239 B2 | 12/2009 | Sato et al. |
| 7,713,849 B2 | 5/2010 | Habib et al. |
| 7,824,801 B2 | 11/2010 | Kogetsu et al. |
| 7,851,086 B2 | 12/2010 | Matsubara et al. |
| 7,879,734 B2 | 2/2011 | Fukutani et al. |
| 8,080,337 B2 | 12/2011 | Higuchi et al. |
| 8,526,166 B2 | 9/2013 | Choi et al. |
| 8,585,918 B2 | 11/2013 | Green et al. |
| 8,597,831 B2 | 12/2013 | Green et al. |
| 8,772,174 B2 | 7/2014 | Green et al. |
| 8,940,192 B2 | 1/2015 | Toyokawa |
| 8,940,437 B2 | 1/2015 | Green et al. |
| 8,945,431 B2 | 2/2015 | Schulz et al. |
| 8,986,577 B2 | 3/2015 | Kang et al. |
| 8,999,583 B2 | 4/2015 | Hirose et al. |
| 9,252,426 B2 | 2/2016 | Green |
| 9,548,489 B2 | 1/2017 | Abdelsalam et al. |
| 10,008,716 B2 | 6/2018 | Abdelsalam et al. |
| 10,077,506 B2 | 9/2018 | Friend et al. |
| 10,090,513 B2 | 10/2018 | Canham et al. |
| 10,103,379 B2 | 10/2018 | Macklin et al. |
| 10,388,948 B2 | 8/2019 | Abdelsalam et al. |
| 10,396,355 B2 | 8/2019 | Cho et al. |
| 2001/0044045 A1 | 11/2001 | Sato et al. |
| 2002/0037433 A1 | 3/2002 | Rasmussen et al. |
| 2002/0074972 A1 | 6/2002 | Narang et al. |
| 2002/0121460 A1 | 9/2002 | Moy et al. |
| 2002/0148727 A1 | 10/2002 | Zhou et al. |
| 2002/0164479 A1 | 11/2002 | Matsubara et al. |
| 2003/0054250 A1 | 3/2003 | Kweon et al. |
| 2003/0099883 A1 | 5/2003 | Ochoa et al. |
| 2003/0150378 A1 | 8/2003 | Winterton et al. |
| 2003/0215711 A1 | 11/2003 | Aramata et al. |
| 2004/0052867 A1 | 3/2004 | Canham |
| 2004/0062990 A1* | 4/2004 | Shimamura ........... H01M 4/366 429/218.1 |
| 2004/0140222 A1 | 7/2004 | Smedley et al. |
| 2004/0166319 A1 | 8/2004 | Li et al. |
| 2004/0185341 A1 | 9/2004 | Yamamoto et al. |
| 2004/0214085 A1 | 10/2004 | Sheem et al. |
| 2005/0031958 A1 | 2/2005 | Fukuoka et al. |
| 2005/0186378 A1 | 8/2005 | Bhatt |
| 2005/0186474 A1 | 8/2005 | Jiang et al. |
| 2005/0233213 A1 | 10/2005 | Lee et al. |
| 2006/0019151 A1 | 1/2006 | Imachi et al. |
| 2006/0099495 A1 | 5/2006 | Suzuki et al. |
| 2006/0102473 A1 | 5/2006 | Bito et al. |
| 2006/0147802 A1 | 7/2006 | Yasuda et al. |
| 2006/0166098 A1 | 7/2006 | Tabuchi et al. |
| 2006/0216603 A1 | 9/2006 | Choi |
| 2006/0251561 A1 | 11/2006 | Farrell et al. |
| 2007/0011102 A1 | 1/2007 | Matsuhira et al. |
| 2007/0020521 A1 | 1/2007 | Obrovac et al. |
| 2007/0031733 A1 | 2/2007 | Kogetsu et al. |
| 2007/0054190 A1 | 3/2007 | Fukui et al. |
| 2007/0077490 A1 | 4/2007 | Kim et al. |
| 2007/0099081 A1 | 5/2007 | Matsuda et al. |
| 2007/0105017 A1 | 5/2007 | Kawase et al. |
| 2007/0111101 A1 | 5/2007 | Ohkubo et al. |
| 2007/0122708 A1 | 5/2007 | Shimamura et al. |
| 2007/0224508 A1 | 9/2007 | Aramata et al. |
| 2007/0255198 A1 | 11/2007 | Leong et al. |
| 2007/0281216 A1 | 12/2007 | Petrat et al. |
| 2008/0038170 A1 | 2/2008 | Sandhage et al. |
| 2008/0062616 A1 | 3/2008 | Matsuda et al. |
| 2008/0090152 A1 | 4/2008 | Kosuzu et al. |
| 2008/0096110 A1 | 4/2008 | Bito et al. |
| 2008/0113269 A1 | 5/2008 | Yamamoto et al. |
| 2008/0124631 A1 | 5/2008 | Fukui et al. |
| 2008/0145752 A1 | 6/2008 | Hirose et al. |
| 2008/0145757 A1 | 6/2008 | Mah et al. |
| 2008/0166474 A1 | 7/2008 | Deguchi et al. |
| 2008/0261112 A1 | 10/2008 | Nagata et al. |
| 2008/0280207 A1 | 11/2008 | Patoux et al. |
| 2008/0286654 A1 | 11/2008 | Sawa et al. |
| 2008/0305395 A1 | 12/2008 | Hirose et al. |
| 2009/0004566 A1 | 1/2009 | Shirane et al. |
| 2009/0004568 A1 | 1/2009 | Hirose et al. |
| 2009/0010833 A1 | 1/2009 | Rosenband et al. |
| 2009/0137688 A1 | 5/2009 | Yang |
| 2009/0143227 A1 | 6/2009 | Dubrow et al. |
| 2009/0162750 A1 | 6/2009 | Kawakami et al. |
| 2009/0169968 A1* | 7/2009 | Iseki ...................... C23C 16/26 429/481 |
| 2009/0169985 A1 | 7/2009 | Yamaguchi et al. |
| 2009/0186267 A1 | 7/2009 | Tiegs |
| 2009/0239151 A1 | 9/2009 | Nakanishi et al. |
| 2009/0246628 A1 | 10/2009 | Adachi et al. |
| 2009/0253033 A1 | 10/2009 | Hirose et al. |
| 2009/0301866 A1 | 12/2009 | Zaghib et al. |
| 2010/0008841 A1 | 1/2010 | Rosenkilde |
| 2010/0009261 A1 | 1/2010 | Watanabe |
| 2010/0112442 A1 | 5/2010 | Fujikawa et al. |
| 2010/0112451 A1 | 5/2010 | Shibutani et al. |
| 2010/0112475 A1 | 5/2010 | Natsume et al. |
| 2010/0143773 A1 | 6/2010 | Honbou |
| 2010/0143798 A1 | 6/2010 | Zhamu et al. |
| 2010/0178565 A1 | 7/2010 | Green |
| 2010/0190061 A1 | 7/2010 | Green |
| 2010/0190062 A1 | 7/2010 | Yamamoto et al. |
| 2010/0196760 A1 | 8/2010 | Green |
| 2010/0209328 A1 | 8/2010 | Bi et al. |
| 2010/0243951 A1 | 9/2010 | Watanabe et al. |
| 2010/0266902 A1 | 10/2010 | Takano et al. |
| 2010/0278931 A1 | 11/2010 | Ashton et al. |
| 2010/0279172 A1 | 11/2010 | Hwang et al. |
| 2010/0285358 A1 | 11/2010 | Cui et al. |
| 2010/0285367 A1 | 11/2010 | Matsui et al. |
| 2010/0288970 A1 | 11/2010 | Watanabe et al. |
| 2010/0291441 A1 | 11/2010 | Ugaji et al. |
| 2010/0297502 A1 | 11/2010 | Zhu et al. |
| 2010/0330418 A1 | 12/2010 | Liang et al. |
| 2010/0330425 A1 | 12/2010 | Lopatin et al. |
| 2011/0001097 A1 | 1/2011 | Aramata et al. |
| 2011/0008531 A1 | 1/2011 | Mikhaylik et al. |
| 2011/0027537 A1 | 2/2011 | Inoue et al. |
| 2011/0039690 A1 | 2/2011 | Niu |
| 2011/0056563 A1 | 3/2011 | Bari |
| 2011/0067228 A1 | 3/2011 | Green |
| 2011/0076560 A1 | 3/2011 | Scordilis-Kelley et al. |
| 2011/0085960 A1 | 4/2011 | Mukasyan et al. |
| 2011/0104480 A1 | 5/2011 | Malekos et al. |
| 2011/0111135 A1 | 5/2011 | Kamiyama et al. |

(56) References Cited

U.S. PATENT DOCUMENTS

| | | |
|---|---|---|
| 2011/0111279 A1 | 5/2011 | Smithyman et al. |
| 2011/0111294 A1 | 5/2011 | Lopez et al. |
| 2011/0123866 A1 | 5/2011 | Pan et al. |
| 2011/0163274 A1 | 7/2011 | Plee et al. |
| 2011/0165468 A1 | 7/2011 | Alias et al. |
| 2011/0236493 A1 | 9/2011 | Canham et al. |
| 2011/0244328 A1 | 10/2011 | Iriyama et al. |
| 2011/0250498 A1 | 10/2011 | Green et al. |
| 2011/0256452 A1 | 10/2011 | Cho et al. |
| 2011/0269019 A1 | 11/2011 | Green et al. |
| 2011/0281180 A1 | 11/2011 | Kim et al. |
| 2011/0287317 A1 | 11/2011 | Nakanishi |
| 2011/0287318 A1 | 11/2011 | Loveness et al. |
| 2011/0294012 A1 | 12/2011 | Nakabayashi et al. |
| 2011/0299223 A1 | 12/2011 | Oh et al. |
| 2011/0311873 A1 | 12/2011 | Schulz et al. |
| 2012/0040242 A1 | 2/2012 | Kurasawa et al. |
| 2012/0094178 A1 | 4/2012 | Loveridge et al. |
| 2012/0100438 A1 | 4/2012 | Fasching et al. |
| 2012/0107688 A1 | 5/2012 | Loveridge |
| 2012/0121999 A1 | 5/2012 | Laurencin et al. |
| 2012/0141872 A1 | 6/2012 | Kim et al. |
| 2012/0171566 A1 | 7/2012 | Yoshitake et al. |
| 2012/0202112 A1 | 8/2012 | Yushin et al. |
| 2012/0244438 A1 | 9/2012 | Kerlau |
| 2012/0255858 A1 | 10/2012 | Maeshima et al. |
| 2012/0315543 A1 | 12/2012 | Wata et al. |
| 2013/0040199 A1 | 2/2013 | Yamamura |
| 2013/0071750 A1 | 3/2013 | Park et al. |
| 2013/0115517 A1 | 5/2013 | Kim et al. |
| 2013/0136986 A1 | 5/2013 | Scoyer et al. |
| 2013/0157127 A1 | 6/2013 | Hirose et al. |
| 2013/0189575 A1 | 7/2013 | Anguchamy et al. |
| 2013/0196158 A1 | 8/2013 | Yoshida et al. |
| 2013/0216907 A1 | 8/2013 | Rayner et al. |
| 2013/0224583 A1 | 8/2013 | Green |
| 2013/0224606 A1 | 8/2013 | Koh et al. |
| 2013/0266865 A1 | 10/2013 | Kwon et al. |
| 2013/0337314 A1 | 12/2013 | Essaki et al. |
| 2014/0004426 A1 | 1/2014 | Kerlau et al. |
| 2014/0021415 A1 | 1/2014 | Kang et al. |
| 2014/0023928 A1 | 1/2014 | Jeon et al. |
| 2014/0030599 A1 | 1/2014 | Lee et al. |
| 2014/0050987 A1 | 2/2014 | Park et al. |
| 2014/0087268 A1 | 3/2014 | Kim et al. |
| 2014/0106230 A1 | 4/2014 | Kim et al. |
| 2014/0147751 A1 | 5/2014 | Yang et al. |
| 2014/0154578 A1 | 6/2014 | Yoo et al. |
| 2014/0162131 A1 | 6/2014 | Friend et al. |
| 2014/0170303 A1 | 6/2014 | Rayner et al. |
| 2014/0193711 A1 | 7/2014 | Biswal et al. |
| 2014/0235884 A1 | 8/2014 | Veinot et al. |
| 2014/0246398 A1 | 9/2014 | Zaghib et al. |
| 2014/0302396 A1 | 10/2014 | Lu et al. |
| 2014/0349183 A1 | 11/2014 | Macklin et al. |
| 2014/0349187 A1 | 11/2014 | Hirose et al. |
| 2015/0037673 A1 | 2/2015 | Zaghib et al. |
| 2015/0044571 A1 | 2/2015 | Abdelsalam et al. |
| 2015/0079472 A1 | 3/2015 | Lin et al. |
| 2015/0104705 A1 | 4/2015 | Canham et al. |
| 2015/0221936 A1 | 8/2015 | Huang |
| 2015/0280221 A1 | 10/2015 | Abdelsalam et al. |
| 2015/0303456 A1 | 10/2015 | Yoo et al. |
| 2015/0325848 A1 | 11/2015 | Yamashita et al. |
| 2015/0380735 A1 | 12/2015 | Tuduki et al. |
| 2016/0126538 A1 | 5/2016 | Hanelt et al. |
| 2016/0172670 A1 | 6/2016 | Friend |
| 2016/0197342 A1 | 7/2016 | Lee et al. |
| 2016/0308205 A1 | 10/2016 | Canham et al. |
| 2017/0033357 A1 | 2/2017 | Cho et al. |
| 2017/0040610 A1 | 2/2017 | Otsuka et al. |
| 2017/0047580 A1 | 2/2017 | Cho et al. |
| 2017/0047581 A1 | 2/2017 | Lu et al. |
| 2017/0133674 A1 | 5/2017 | Murphy et al. |
| 2017/0200939 A1 | 7/2017 | Murphy et al. |
| 2017/0214042 A1 | 7/2017 | Cho et al. |
| 2017/0346079 A1 | 11/2017 | Friend et al. |
| 2017/0352883 A1 | 12/2017 | Cho et al. |
| 2018/0034056 A1 | 2/2018 | Cho et al. |
| 2018/0069234 A1 | 3/2018 | Friend et al. |
| 2018/0083263 A1 | 3/2018 | Cho et al. |
| 2019/0190020 A1 | 6/2019 | Park et al. |
| 2019/0198869 A1 | 6/2019 | Park et al. |
| 2019/0296340 A1 | 9/2019 | Cho et al. |

FOREIGN PATENT DOCUMENTS

| | | |
|---|---|---|
| CN | 101188281 A | 5/2008 |
| CN | 101335342 A | 12/2008 |
| CN | 101442124 A | 5/2009 |
| CN | 101471457 A | 7/2009 |
| CN | 101591478 A | 12/2009 |
| CN | 102157731 A | 8/2011 |
| CN | 102244251 A | 11/2011 |
| CN | 103 165 870 A | 6/2013 |
| CN | 103 633 295 A | 3/2014 |
| CN | 103840140 A | 6/2014 |
| CN | 104103807 A | 10/2014 |
| CN | 105742611 A | 7/2016 |
| EP | 0281115 A2 | 9/1988 |
| EP | 1054462 A1 | 11/2000 |
| EP | 1335438 A1 | 8/2003 |
| EP | 1427039 A2 | 6/2004 |
| EP | 1750314 A1 | 2/2007 |
| EP | 1791199 A1 | 5/2007 |
| EP | 2037516 A1 | 3/2009 |
| EP | 2051317 A1 | 4/2009 |
| EP | 2383224 A1 | 11/2011 |
| EP | 2509142 A1 | 10/2012 |
| EP | 2873646 A1 | 5/2015 |
| EP | 2533331 B1 | 8/2015 |
| EP | 2966037 A1 | 1/2016 |
| EP | 3093910 A1 | 11/2016 |
| GB | 980513 A | 1/1965 |
| GB | 2000191 A | 1/1979 |
| GB | 2395059 A | 5/2004 |
| GB | 2464158 A | 4/2010 |
| GB | 2470056 A | 11/2010 |
| GB | 2483372 A | 3/2012 |
| GB | 2495951 A | 5/2013 |
| JP | 06-325765 A | 11/1994 |
| JP | 11-250896 | 9/1999 |
| JP | 2000-082459 A | 3/2000 |
| JP | 2000-243395 A | 9/2000 |
| JP | 2001-266866 A | 9/2001 |
| JP | 2002-151055 A | 5/2002 |
| JP | 2002-170561 A | 6/2002 |
| JP | 2003-077463 A | 3/2003 |
| JP | 2003-100296 A | 4/2003 |
| JP | 2003-303586 A | 10/2003 |
| JP | 2004-185984 A | 7/2004 |
| JP | 2004/214054 A | 7/2004 |
| JP | 2004-303593 A | 10/2004 |
| JP | 2004281317 A | 10/2004 |
| JP | 2004-311429 A | 11/2004 |
| JP | 2005-63955 A | 3/2005 |
| JP | 2005-259697 A | 9/2005 |
| JP | 03714665 B2 | 11/2005 |
| JP | 2006-100244 A | 4/2006 |
| JP | 2006172860 A | 6/2006 |
| JP | 2006-269216 A | 10/2006 |
| JP | 2007-042285 A | 2/2007 |
| JP | 2007-080652 A | 3/2007 |
| JP | 2007-128766 A | 5/2007 |
| JP | 2007-220585 A | 8/2007 |
| JP | 2007-294423 A | 11/2007 |
| JP | 2007-335283 A | 12/2007 |
| JP | 2007318057 A | 12/2007 |
| JP | 2007335198 A | 12/2007 |
| JP | 2008-004460 A | 1/2008 |
| JP | 2008-166013 A | 7/2008 |
| JP | 2008186732 A | 8/2008 |
| JP | 4171904 B2 | 10/2008 |
| JP | 2008-277231 A | 11/2008 |

(56) References Cited

FOREIGN PATENT DOCUMENTS

| | | |
|---|---|---|
| JP | 2008-293872 A | 12/2008 |
| JP | 2008305746 A | 12/2008 |
| JP | 2010-021100 A | 1/2010 |
| JP | 4401984 B2 | 1/2010 |
| JP | 2010-080196 A | 4/2010 |
| JP | 2010-218848 A | 9/2010 |
| JP | 2010205609 A | 9/2010 |
| JP | 2011-009228 A | 1/2011 |
| JP | 2011002013 A | 1/2011 |
| JP | 2011-142021 A | 7/2011 |
| JP | 2011-192629 A | 9/2011 |
| JP | 2011/198614 A | 10/2011 |
| JP | 2011-233497 A | 11/2011 |
| JP | 2011-527982 A | 11/2011 |
| JP | 2012-009457 A | 1/2012 |
| JP | 2012-033317 A | 2/2012 |
| JP | 2012084521 A | 4/2012 |
| JP | 2012084522 A | 4/2012 |
| JP | 2012-178269 A | 9/2012 |
| JP | 2013/008585 A | 1/2013 |
| JP | 2013-131324 A | 7/2013 |
| JP | 2014-2890 A | 1/2014 |
| JP | 2014/082118 A | 5/2014 |
| JP | 5603018 B2 | 10/2014 |
| JP | 2014-534142 A | 12/2014 |
| KR | 2003-0028241 A | 4/2003 |
| KR | 100 578 871 B1 | 5/2006 |
| KR | 2008-0091883 A | 10/2008 |
| KR | 10-2011-0072917 A | 6/2011 |
| KR | 2011-0116585 A | 10/2011 |
| KR | 2012-0089512 A | 8/2012 |
| KR | 2012-0093756 A | 8/2012 |
| KR | 10-1204192 B1 | 11/2012 |
| KR | 2012-0120034 A | 11/2012 |
| KR | 2013-0031778 A | 3/2013 |
| KR | 2013-0050704 A | 5/2013 |
| KR | 2013 0107892 A | 10/2013 |
| KR | 2013-0114007 A | 10/2013 |
| KR | 10-1341951 B1 | 12/2013 |
| KR | 2013-0139554 A | 12/2013 |
| KR | 2014-0012351 A | 2/2014 |
| KR | 2014-0022679 A | 2/2014 |
| KR | 20140070227 A | 6/2014 |
| KR | 2014-0100514 A | 8/2014 |
| KR | 10-1441447 B1 | 9/2014 |
| WO | WO-97/01193 A1 | 1/1997 |
| WO | WO-2004/049473 A2 | 6/2004 |
| WO | WO-2004/086539 A1 | 10/2004 |
| WO | WO-2005/075048 A1 | 8/2005 |
| WO | WO-2005/096414 A2 | 10/2005 |
| WO | WO-2006/068066 A1 | 6/2006 |
| WO | WO-2006/097380 A1 | 9/2006 |
| WO | WO-2006/135375 A2 | 12/2006 |
| WO | WO-2007/037787 A1 | 4/2007 |
| WO | WO-2007/083152 A1 | 7/2007 |
| WO | WO-2007/083155 A1 | 7/2007 |
| WO | WO-2007/094641 A1 | 8/2007 |
| WO | WO-2008/044683 A1 | 4/2008 |
| WO | WO-2009/010758 A2 | 1/2009 |
| WO | WO-2009/010759 A1 | 1/2009 |
| WO | WO-2009/033082 A2 | 3/2009 |
| WO | WO-2009/050585 A1 | 4/2009 |
| WO | WO-2009/063801 A1 | 5/2009 |
| WO | WO-2009/089018 A2 | 7/2009 |
| WO | WO-2009/128800 A1 | 10/2009 |
| WO | WO-2010/026332 A1 | 3/2010 |
| WO | WO-2010/040985 A1 | 4/2010 |
| WO | WO-2010/128310 A1 | 11/2010 |
| WO | WO-2010/130975 A1 | 11/2010 |
| WO | WO-2010/130976 A1 | 11/2010 |
| WO | WO-2010/139987 A2 | 12/2010 |
| WO | WO-2011/042742 A1 | 4/2011 |
| WO | WO-2011/117436 A1 | 9/2011 |
| WO | WO-2012/028857 A1 | 3/2012 |
| WO | WO-2012/028858 A1 | 3/2012 |
| WO | WO-2012/084570 A1 | 6/2012 |
| WO | WO-2012/093224 A1 | 7/2012 |
| WO | WO-2012/175998 A1 | 12/2012 |
| WO | WO-2013/021630 A1 | 2/2013 |
| WO | WO-2013/024305 A2 | 2/2013 |
| WO | WO-2013/049939 A1 | 4/2013 |
| WO | WO-2013/114094 A1 | 8/2013 |
| WO | WO-2013/128201 A2 | 9/2013 |
| WO | WO-2013/140177 A2 | 9/2013 |
| WO | WO-2013/146658 A1 | 10/2013 |
| WO | WO-2013/179068 A2 | 12/2013 |
| WO | WO-2014/068318 A1 | 5/2014 |
| WO | WO-2015/003996 A1 | 1/2015 |
| WO | WO-2015/041450 A1 | 3/2015 |
| WO | WO-2015/082920 A1 | 6/2015 |
| WO | WO-2015/157358 A1 | 10/2015 |
| WO | WO-2016/102098 A1 | 6/2016 |
| WO | WO-2016/102208 A1 | 6/2016 |
| WO | WO-2016/108645 A1 | 7/2016 |
| WO | WO-2016/174023 A1 | 11/2016 |

OTHER PUBLICATIONS

Bang, B.M. et al., Scalable Approach to Multi-Dimensional Bulk Si Anodes via Metal-Assisted Chemical Etching, Energy & Environmental Science, 4:5013-5019 (2011).

Chartier, C. et al., Metal-assisted chemical etching of silicon in HF-H2O2, Electrochimica Acta, 53(17):5509-5516 (2008).

Chen et al., Mesoporous Silicon Anodes Prepared by Magnesiothermic Reduction for Lithium Ion Batteries, Journal of the Electrochemical Society, 158(9):A1055-A1059 (2011).

Chen, X. et al., A Patterned 3D Silicon Anode Fabricated by Electrodeposition on a Virus-Structured Current Collector, Advanced Function Materials, 21:380-387 (2011).

Choi et al., Silica nanofibres from electrospinning/sol-gel process, J. Mater. Sci. Letters, 22:891-893 (2003).

Cui, et al. Doping and Electrical Transport in Silicon Nanowires, Journal of Physical Chemistry, 104(22):5213-5216 (2000).

Cullis et al., Structural and Luminescence properties of porous silicon, Applied Physics Reviews, 82(3):909-965 (1997).

Gao et al., Alloy formation in Nanostructured Silicon, Journal of Advanced Materials, 13(11):816-819 (2001).

Gao, B, Synthesis and Electrochemical Properties of Carbon Nanotubes and Silicon Nanowires, Ph.D. Thesis in Applied and Material Sciences, University of North Carolina Chapel Hill (2001).

Graetz, J. et al., Highly reversible lithium storage in nanostructured silicon, Journal of the Electrochemical Society, 6(9):194-197 (2003).

Hatchard, T. D. and Dahn, J. R., In Situ XRD and Electrochemical Study of the Reaction of Lithium with Amorphous Silicon, Journal of the Electrochemical Society, 151(6):A838-A842 (2004).

Huang, Z. et al., Metal-Assisted Chemical Etching of Silicon: A Review, Adv. Mater. 23:285-308 (2011).

International Search Report, PCT/KR2015/003575, 4 pages, dated May 21, 2015.

Jia et al., Novel Three-Dimensional Mesoporous Silicon for High Power Litium-Ion Battery Anode Material, Advs. Energy Mater., 1:1036-1039 (2011).

Jia et al., Supporting Information for Advs. Energy Mater., DOI: 10.1002/aenm.201100485: Novel Three-Dimensional Mesoporous Silicon for High Power Litium-Ion Battery Anode Material, Advanced Energy Materials, DOI: 10.1002/aenm.201100485, 4 pages, (2011).

Jung, K. H. et al., Developments in Luminescent Porous Si, J. Electrochem. Soc., 140(10):3046-3064 (1993).

Jung, S. C. et al., Anisotropic Volume Expansion of Crystalline Silicon during Electrochemical Lithium Insertion: An Atomic Level Rationale, Nano Letters, 12:5342-5347, (2012).

Krissanasaeranee et al., Preparation of Ultra-Fine Silica Fibers Using Electrospun Ply(Vinyl Alcohol)/Silatrane Composite Fibers as Precursor, J. Am. Ceram. Soc., 91(9):2830-2835 (2008).

Kuriyama, K. et al., Anomalous electrical resistivity and photovoltaic phenomenon in the fast mixed conductor lithium silicide Li12Si7, Physical Review, 38(18):1436-38 (1988).

(56) References Cited

OTHER PUBLICATIONS

Lestriez, B. et al., Hierarchical and Resilient Conduction Network of Bridged Carbon Nanotubes and Nanofibers for High-Energy Si Negative Electrodes, Electrochemical and Solid-State Letters, 12(4):76-80 (2009).

Li, H. et al., The crystal structural evolution of nano-Si anode caused by lithium insertion and extraction at room temperature, Solid State Ionics 135:181-191 (2000).

Ma et al., Silver nanoparticles decorated, flexible $SiO_2$ nanofibers with long-term antibacterial effect as reusable wound cover, Colloids and Surfaces A: Physicochem. Eng. Aspects 387:57-64 (2011).

Machine Translation, JP 2012-084521 A, Yoshida et al., Apr. 26, 2012.

Mallet, J. et al., Growth of silicon nanowires of controlled diameters by electrodeposition in ionic liquid at room temperature, Nanoletters, 8(10):3468-3474 (2008).

Meijer, J.A. et al., Electrical resistivity and 7Li Knight shift of liquid Li—Si alloys, J. Phys. Condens. Matter I, 5283-5289 (1989).

Morales, Alfredo M. and Lieber, Charles M., A Laser Ablation Method for the Synthesis of Crystalline Semiconductor Nanowires, Science, 279(9):208-211 (1998).

Ohara, S. et al., A thin film silicon anode for Li-ion batteries having a very large specific capacity and long cycle life, Journal of Power Sources, (136):303-306 (2004).

Oudenhoven, Jos F. M. et al., All-solid-State Lithium-Ion Microbatteries: A Review of Various Three-Dimensional Concepts, Adv. Energy Mater. 1:10-33 (2011).

Park, M. H. et al., Silicon Nanotube Battery Anodes, Nano Letters, 9(11):3844-3847 (2009).

Pukird et al., Synthesis and Characterization of $SiO_2$ Nanowires Prepared from Rice Husk Ash, J. Metals, Materials and Minerals, 19(2):33-37 (2009).

Ren, W. et al., Preparation of porous silicon/carbon microspheres as high performance anode materials for lithium ion batteries, Journal of Materials Chemistry A: Materials for Energy and Sustainability, 3(11):5859-5865 (2015).

Richman et al., Ordered Mesoporous Silicon through Magenium Reduction of Polymer Templated Silica Thin Films, Nano Lett., 8(9):3075-3079 (2008).

Robinson, D. and Walsh, F.C., The Performance of a 500 Amp Rotating Cylinder Electrode Reactor. Part 1: Current-Potential Data and Single Pass Studies, Hydrometallurgy, 26:93 (1991).

Rongguan, L. et al., Electrodeposited porous-microspheres Li—Si films as negative electrodes in lithium-ion batteries, Journal of Power Sources, 196(8):3868-3873 (2011).

Schmuck, M. et al, Alloying of electrodeposited silicon with lithium—a principal study of applicability as a node material for lithium ion batteries, J. Solid State Electrochem, 14:2203-2207 (2010).

Shih, S. et al., Transmission electron microscopy study of chemically etched porous Si, Applied Physical Letters, 62(5):467-69 (1993).

Shin, H. C. et al., Nanoporous Structures Prepared by an Electrochemical Deposition Process, Advanced Materials, 15:19, 1610-1614 (2003).

Sinha, S. et al., Synthesis of Silicon Nanowires and Novel Nano-Dendrite Structures, CP544 Electronic Properties of Novel Materials Molecular Nanostructures, 431-436 (2000).

Sinha, S. et al., Synthesis of silicon nanowires and novel nano-dendrite structures, Journal of Nanoparticle Research 6: 421-425 (2004).

Stoemenos, J. et al., Silicon on Insulator Obtained by High Dose Oxygen Implantation, Microstructure, and Formation Mechanism, J. Electrochem. Soc., 142(4):1248-1260, (1995).

Su, L. et al., Core Double-shell $Si@SiO_2@C$ nanocomposites as anode materials for Li-ion batteries, Chemical Communication, 46:2590-2592 (2010).

Tarascon, J M. et al., An update of the Li metal-free rechargeable battery based on $Li_{1+x}Mn_2O_4$ cathodes and carbon anodes, Journal of Power Sources, 43-44:689-700 (1993).

Teschke, O. et al., Test cell simulating the operating conditions of water electrolysers for the evaluation of gas evolving electrocatalysts, Journal of Applied Electrochemistry, 13(3):371-376 (1983).

Van Schalkwijk, Walter A. and Scrosati, Bruno, Advances in Lithium-Ion Batteries (edited 2002 Excerpts).

Wachtler, M. et al., Anodic materials for rechargeable Li-batteries, Journal of Power Sources 105:151-160 (2002).

Wakihara, M., Recent development in lithium ion batteries, Materials Science and Engineering, R33:109-134 (2001).

Webb, P.A. and Orr, C., Modern Methods of Particle Characterization, Micromeritics, 17 pages (1998).

Winter, M. et al., Insertion Electrode Materials for Rechargeable Lithium Batteries, Adv. Mater. 10(10):725-763 (1988).

Winter, Martin and Brodd, Ralph J., Batteries versus Fuel Cells versus Electrochemical Capacitors, Chem. Rev. 104:4245-4269 (2004).

Xiao, et al., Stabilization of Silicon Anode for Li-ion Batteries, Journal of the Electrochemical Society, 157(10):1047-1051 (2010).

Xu, R. et al., Comparison of sizing small particles using different technologies, Powder Technology, 132:145-153, (2003).

Yang, J. et al., Si/c composites for high capacity lithium storage materials, Journal of the Electrochemical Society, 6(8):154-156 (2003).

Yu et al., Reversible Storage of Lithium in Silver-Coated Three-Dimensional Macroporous Silicon, Adv. Mater., 22:2247-2250 (2010).

Zhang et al., Vapor-induced solid-liquid-solid process for silicon-based nanowire growth, Journal of Power Sources 195:1691-1697 (2010).

Zhang, Sheng Shui, A review on electrolyte additives for lithium-ion batteries, Journal of Power Sources, 162:1379-1394 (2006).

Zhou, G. W. et al., Controlled Li doping of Si nanowires by electrochemical insertion methods, Applied Physics Letters, 75(16):2447-2449 (1999).

\* cited by examiner

NEGATIVE ELECTRODE ACTIVE MATERIAL FOR SECONDARY BATTERY AND METHOD FOR MANUFACTURING SAME

The present application is a continuation of U.S. patent application Ser. No. 15/302,957, filed on Oct. 7, 2016, which is a U.S. National Stage Entry under 35 U.S.C. § 371 of International Patent Application No. PCT/KR15/003575, filed on Apr. 9, 2015, which claims priority to Korean Patent Application No. 10-2014-042226, filed on Apr. 9, 2014, the disclosure of each of which is hereby incorporated by reference herein in its entirety.

TECHNICAL FIELD

The inventive concept relates to a secondary battery technology, and more particularly, to an anode active material for a secondary battery and a method of fabricating the anode active material.

BACKGROUND ART

Secondary batteries are rechargeable and dischargeable by using an electrode material having excellent reversibility, and lithium secondary batteries have been commercialized representatively. Lithium secondary batteries are expected to be provided in moveable units such as vehicles or to be applied as medium and large sized power source used in a power storage of a power supply network such as a smart grid, as well as small sized power source of small information technology (IT) appliances such as smart phones, portable computers, and electronic paper.

When lithium metal is used as an anode material of a lithium secondary battery, dendrites may be formed, and thereby causing shorting of the battery or a risk of explosion. Thus, instead of using the lithium metal, crystalline carbon such as graphite and artificial graphite or carbon based active material such as soft carbon or hard carbon having a theoretical capacity of 372 mAh/g and capable of intercalating and deintercalating lithium ions has been mainly used as an anode. However, as applications of secondary batteries have increased, demands for secondary batteries having high capacity and high output have increased more, and accordingly, non-carbon based anode materials capable of generating an alloy with lithium, for example, silicon (Si), tin (Sn), or aluminum (Al) having a capacity of 500 mAh/g or greater that may replace the theoretical capacity of the carbon based anode material, have drawn attention.

Among the above non-carbon based anode materials, silicon has a theoretical capacity of about 4200 mAh/g that is the largest among those materials, and thus, applications of silicon are considered to be important in view of capacity. However, since silicon expands about four times greater in volume during a charging operation, an electric connection between active materials may broke or an active material may be isolated from a current collector due to a volume variation during charging and discharging processes, and an irreversible reaction such as forming of a solid electrolyte interface (SEI) may occur and lifespan may degrade because of an erosion of the active material due to an electrolyte. Therefore, there is a barrier in commercializing the silicon as the anode material.

Therefore, in order to apply a silicon material, it is necessary to restrain the volume variation during the charging and discharging and to improve an irreversible capacity of a battery. In addition, as demands for secondary batteries explosively increase, it is necessary to ensure a fabricating technology capable of massively producing silicon anode active materials.

DISCLOSURE OF THE INVENTION

Technical Problem

The inventive concept provides an anode active material capable of improving an irreversible capacity and reducing a volume variation during charging and discharging to have a high energy density, high capacity, and longer lifespan, by using silicon.

The inventive concept provides a method of economically, rapidly, and massively fabricating a silicon anode active material having the above advantages.

Technical Solution

According to an aspect of the inventive concept, there is provided a silicon-based active material composite including: silicon and silicon oxide formed by oxidizing at least some of the silicon, wherein an amount of oxygen with respect to a total weight of the silicon and the silicon oxide is restricted to 9 wt % to 20 wt %.

In one embodiment, the silicon-based active material composite may include a core of the silicon, and a shell of the silicon oxide for surrounding the core. The shell of the silicon oxide may have a thickness ranging from 2 nm to 30 nm. Preferably, the shell of the silicon oxide may have a thickness ranging from 3 nm to 15 nm. In another embodiment, the silicon-based active material composite may include a silicon matrix and the silicon oxide dispersed in the silicon matrix.

An average diameter of the silicon-based active material composite may range from 30 nm to 300 nm. Preferably, an average diameter of the silicon-based active material composite may range from 30 nm to 200 nm. In one embodiment, a conductive layer may be formed on an outer portion of the silicon-based active material composite. The conductive layer may include an amorphous carbon layer or conductive metal oxide particles.

According to another aspect of the inventive concept, there is provided a method of fabricating a silicon-based active material composite, the method including: providing silicon particles; and oxidizing the silicon particles to form a silicon-based active material composite including silicon and silicon oxide obtained by oxidizing at least a part of the silicon, wherein an amount of oxygen with respect to a total weight of the silicon and the silicon oxide is restricted to 9 wt % to 20 wt %.

In one embodiment, the oxidizing of the silicon particles may be performed by chemically oxidizing the silicon particles in a liquid solvent containing oxygen. The liquid solvent containing oxygen may include methanol, isopropyl alcohol (IPA), hydrogen peroxide ($H_2O_2$), water, or a mixed solvent including two or more thereof.

In another embodiment, the oxidizing of the silicon particles may be performed by implanting oxygen ions into the silicon particles. In this case, the method may further include performing a thermal treatment at a low temperature of 50° C. to 200° C. for combining a silicon matrix and implanted oxygen while excluding a possibility of thermal oxidation of the silicon.

Advantageous Effects

According to an aspect of the inventive concept, a composite of pure silicon, which includes silicon and silicon oxide obtained by oxidizing at least a part of the silicon and contains oxygen, an amount of which is restricted to 9 wt % to 20 wt % with respect to a total weight of the silicon and the silicon oxide, is manufactured in order to provide a silicon-based active material composite capable of improving lifespan and reliability while maintaining a capacity thereof at 80% or greater with respect to a theoretical capacity of silicon.

In addition, according to an aspect of the inventive concept, a method of economically fabricating a silicon-based active material composite is provided, and thereby obtaining massively the silicon-based active material composite having the above advantages by oxidizing silicon particles in a liquid solvent containing oxygen or oxidizing silicon by implanting oxygen ions.

MODE FOR CARRYING OUT THE INVENTION

Figure 1A:
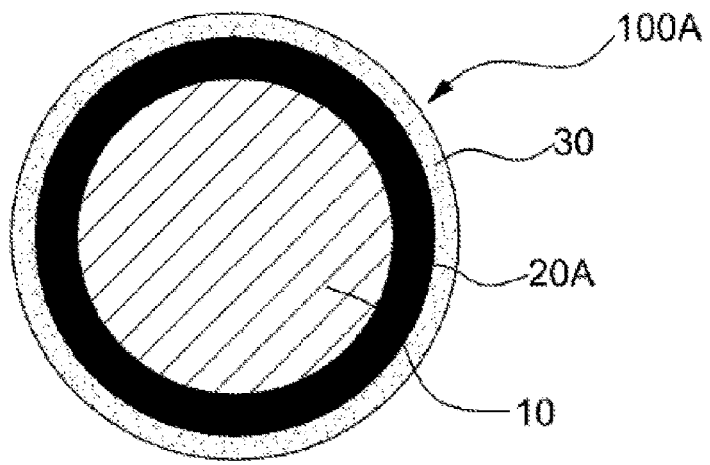
FIGS. 1A and 1B are cross-sectional views respectively showing a silicon-based active material composite according to various embodiments of the inventive concept.

Hereinafter, preferred embodiments of the inventive concept will be described in detail with reference to accompanying drawings.

Embodiments of the inventive concept will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art.

In the drawings, lengths and sizes of layers and regions may be exaggerated for convenience of description and clarity, and like reference numerals in the drawings denote like elements. As used herein, the term "and/or" includes any and all combinations of one or more of the associated listed items.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "comprise" and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Figure 1B:
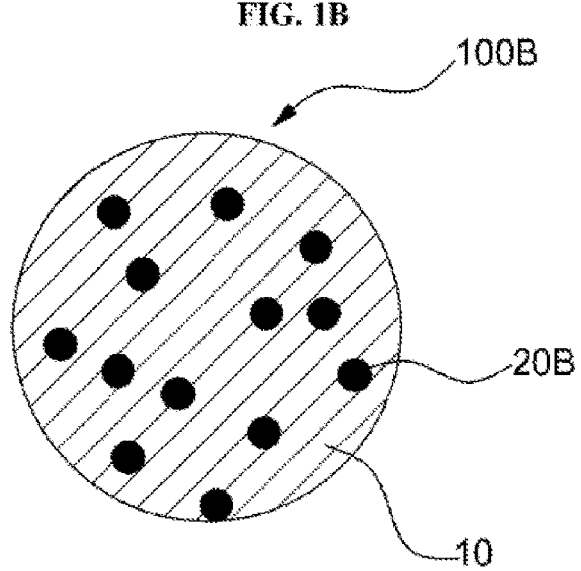

FIGS. 1A and 1B are cross-sectional views respectively showing silicon-based active material composites 100A and 100B according to various embodiments of the inventive concept.

Referring to FIGS. 1A and 1B, the silicon-based active material composites 100A and 100B each has a grain structure. The silicon-based active material composite 100A of FIG. 1A includes a silicon core 10 and a shell 20A surrounding the silicon core 10 and including silicon oxide. As shown in FIG. 1B, the silicon-based active material composite 100B may include a silicon matrix 10 and silicon oxide 20B distributed in the matrix 10.

In some embodiments, the silicon-based active material composite 100A may further include a conductive layer 30 at the outermost portion thereof. The conductive layer 30 may further include a carbon-based conductive layer such as graphite, soft carbon, or grapheme. The conductive material 30 is provided for electric connection between the silicon-based active material composites 100A contacting each other, and for reducing an internal resistance in a current collector (not shown).

In some embodiments, the carbon-based conductive layer may be a crystalline carbon layer or at least partially amorphous carbon layer. If a carbon-based conductive layer has a high crystalline property, it may be graphite, but in this case, a surface thereof may react with an electrolyte. However, a low-crystalline or an amorphous carbon layer has a chemical corrosion resistance with respect to the electrolyte, decomposition of the electrolyte is restrained during charging and discharging, and thereby improving lifespan of an anode. Also, the carbon-based conductive layer may have $SP_2$ graphite structure having conductivity and $SP_3$ diamond structure having an insulating property together. In order for the carbon-based conductive layer to have conductivity, $SP_2$ may have a mole fraction that is greater than that of $SP_3$, and the mole fraction may be adjusted through a thermal treatment process.

The above carbon-based conductive layer is an example, and the inventive concept is not limited thereto. For example, the outermost portion of the silicon-based active material composite 100A may include nano-scale particles of conductive metal oxide such as antimony tin oxide or antimony zinc oxide, or another conductive layer such as a layer of the nano-scale particles. Although not shown in FIG. 1B, the conductive layer 30 may be additionally provided on the silicon-based active material composite 100B.

The silicon-based active material composites 100A and 100B contain oxygen, an amount of which is limited to a range of 9 wt % to 20 wt % with respect to a total weight of silicon forming the silicon core 10 and the silicon matrix 10 and the shell 20A including silicon oxide and the distributed silicon oxide 20B. Within the above range of the oxygen amount, the silicon-based active material composite having an initial charging rate and a capacity maintenance characteristic, both of which are maintained at 80% or greater, and suitable for commercialization may be provided. The silicon core 10 and the silicon matrix 10 may include primary particles, but may include secondary particles obtained from agglomeration of the primary particles. In this case, the amount of oxygen with respect to the total weight of the silicon and silicon oxide in the silicon-based active material composite is 10 wt % to 20 wt %.

The amount of oxygen is measured in an infrared ray detection method by using a commercialized element analyzer (ELTRA ONH-2000). In more detail, oxygen existing in a sample is converted into carbon dioxide by using a sample amount of 2 mg to 10 mg, calories of 8 kW, and helium (purity 99.995%) as a carrier gas, and then, a generation amount of carbon dioxide is measured to quantize the oxygen amount.

Table 1 below illustrates an initial efficiency and a capacity maintenance rate of a half cell according to an amount of oxygen, wherein the half cell has an anode manufactured by using the silicon-based active material composite according to the embodiments of the inventive concept. The capacity maintenance rate was measured after performing charging/discharging 50 times. An initial capacity that becomes a reference was 4200 mAh/g, that is, a theoretical capacity of silicon, and a power to weight ratio of the composite, which was measured according to the amount of oxygen, was illustrated.

TABLE 1

| | Battery characteristics | | |
|---|---|---|---|
| O wt % | Initial charging/ discharging efficiency | Power to weight ratio | Retention @ 50 times |
| 5 | 92% | 2,800 mAh/g | 40% |
| 7 | 90% | 2,700 mAh/g | 64% |
| 9 | 90% | 2,300 mAh/g | 83% |
| 10.00 | 89% | 2,200 mAh/g | 84% |
| 15.00 | 84% | 1,900 mAh/g | 97% |
| 20.00 | 81% | 1,700 mAh/g | 98% |
| 25.00 | 75% | 1,500 mAh/g | 97% |
| 30.00 | 62% | 1,100 mAh/g | 101% |
| 31 | 50% | 730 mAh/g | 99% |
| 35 | 53% | 620 mAh/g | 102% |

When the amount of oxygen is less than 9 wt %, an effect of restraining volume expansion is insufficient, and thus, the capacitance maintenance rate of the silicon-based active material composite is reduced to 80% or less and lifespan deterioration due to the volume variation may not be addressed. However, when the amount of oxygen exceeds 20%, although the capacity maintenance rate is improved, the initial charging/discharging efficiency is reduced to 80% or less and an energy density degrades.

In the silicon-based active material composite, the silicon oxide may restrain the irreversibility according to the charging and discharging to improve the lifespan, by providing a tool that is capable of absorbing the stress caused by the volume variation of the silicon according to the charging and discharging. However, the silicon oxide has a lower capacity than that of silicon, and thus, an amount of silicon oxide has to be limited as illustrated in Table 1 above. The silicon oxide applied as a substitute for addressing the high volume expansion rate of silicon reduces the energy density due to an excessive oxygen amount, but in the silicon-based active material composite according to the embodiment of the inventive concept, the amount of oxygen is adjusted as described above in order to reduce the irreversibility caused by the capacity and volume variation, and thereby allowing the silicon-based active material composite to be applied as the anode active material.

The above described capacity and the capacity maintenance characteristics of the silicon-based active material composite are identified to be dependent upon sizes of the silicon-based active material composites 100A and 100B having the grain structures. The silicon-based active material composites 100A and 100B may have an average grain size in a range of 30 nm to 300 nm, and preferably, a range of 30 nm to 200 nm. When the average grain size is less than 30 nm, a relative ratio of the conductive layer or a conductive material of the particle type in an active material slurry increases, and then, a battery capacity is reduced less than 80%. In addition, when the average grain size exceeds 300 nm, a thickness of the shell including silicon oxide increases in a case of the composite 100A of the core-shell type, and thus, the capacity is greatly reduced to 50% or less even though the irreversibility according to the volume variation is improved. It is estimated that when the thickness of the shell including silicon oxide increases as described above, silicon oxide is more involved in oxidation and reduction of lithium even if the density of silicon oxide is appropriately controlled, and thus, it is difficult for the silicon core to act as the active material.

In one embodiment, in the silicon-based active material composite 100A of the core-shell structure, the shell 20A has a thickness of 2 nm to 30 nm, and within the above range, the silicon-based active material composite 100A has an initial capacity of 80% or greater. Preferably, the shell 20A of the silicon-based active material composite 100A of the core-shell structure has a thickness of 3 nm to 15 nm, and within the above range, the silicon-based active material composite 100A has an initial capacity of 90% or greater. When the thickness of the shell 20A is less than 2 nm, the volume expansion of the silicon core 10 may not be prevented due to a low mechanical strength, and when the thickness exceeds 30 nm, the shell 20A screens the silicon core 10 therein, and thereby resulting in capacity reduction.

Figure 2:
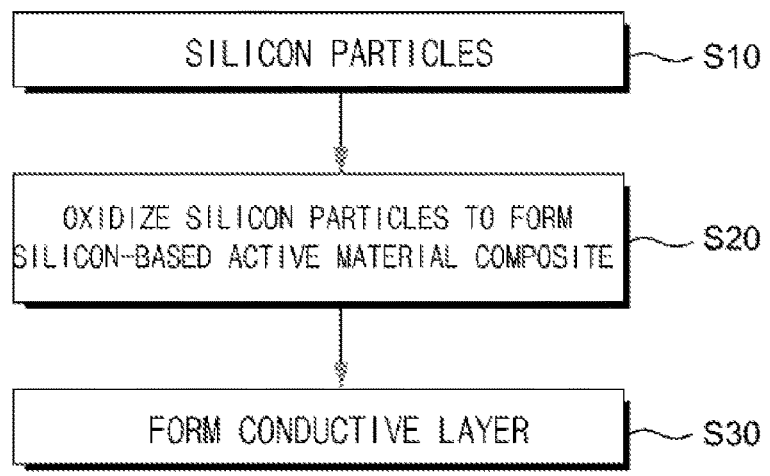
FIG. 2 is a flowchart illustrating a method of fabricating a silicon-based active material composite according to an embodiment of the inventive concept.

FIG. 2 is a flowchart illustrating a method of fabricating a silicon-based active material composite according to an embodiment of the inventive concept.

Referring to FIG. 2, silicon particles are prepared (S10). The silicon particle may be polysilicon or single crystalline silicon coarse particle, and moreover, may be amorphous particle having low crystalline property. The coarse particles may become nano-particles through a grinding process or a polishing process, or a silicon material of a large volume, for example, silicon load or wafer, may be electrically exploded to prepare the silicon particles. The silicon particles are controlled so that a silicon-based active material composite formed through a process of forming silicon oxide that will be described later may have an average grain size ranging from 30 nm to 300 nm, and more preferably, from 30 nm to 200 nm.

The silicon particles that are miniaturized are oxidized to form a silicon-based active material composite including silicon and at least a part of silicon that is oxidized (S20). Oxidation of the silicon particles accomplishes by the thermal oxidation. However, the above thermal oxidation is likely to induce oxidation reaction of silicon under a thermal equilibrium state, and thereby forming dense silicon oxide ($SiO_2$ that substantially satisfies stoichiometry). However, even if such above silicon oxide that is dense and thermally oxidized restrains the volume variation of the silicon core and maintains the capacity maintenance rate at 80% or greater, the silicon oxide may screen the silicon core therein, and thus, it is identified that the capacity may be rapidly reduced to 60% of a theoretical capacity of silicon or less.

Therefore, in one embodiment, oxidation of the silicon particles may be achieved by chemically oxidizing the silicon particles within a liquid solvent containing oxygen. The silicon-based active material composite formed as above has an amount of oxygen restricted within a range of 9 wt % to 20 wt % with respect to total weight of silicon and silicon oxide. The liquid solvent containing oxygen may be methanol, isopropyl alcohol (IPA), hydrogen peroxide ($H_2O_2$), water, or a mixed solvent including two or more thereof, and more preferably, water having less environmental load.

Methanol is hydrocarbon having the largest amount of oxygen with respect to carbon, and restrains generation of carbon component that may occur in other hydrocarbon. Thus, methanol is advantageous for forming the silicon-based active material composite having the silicon core and the silicon oxide shell formed on the core. Actually, in other hydrocarbon, generation of silicon oxide on the silicon core may be interfered or an additional thermal treatment is necessary for removing carbon in order to form the silicon oxide, and dense $SiO_2$ is formed due to the thermal oxidation.

In another embodiment, the silicon-based active material composite may be manufactured by an oxygen ion implantation process for injecting oxygen into silicon particles that are miniaturized. The silicon particles become a silicon matrix, and ion-implanted oxygen provides silicon oxide distributed in the silicon matrix. Ion implantation energy and density in the ion implantation process are adjusted so that an amount of oxygen is limited within a range of 9 wt % to 20 wt % with respect to total weight of silicon and silicon oxide in the silicon-based active material composite. In order to combine the silicon matrix with implanted oxygen while restraining densification due to the thermal oxidation of silicon, a thermal treatment may be additionally performed at a low temperature of 50° C. to 200° C.

In another embodiment, the silicon coarse particles undergo a grinding or a polishing process, and at the same time, the silicon particles are chemically oxidized by at least one of compressive stress and shearing stress induced from the above process to provide a silicon-based active material composite. If a slurry of the silicon particles is formed by using the liquid solvent containing oxygen and the grinding and polishing processes are performed on the slurry, the particles are miniaturized to increase a sensitivity with respect to stress, and thus chemical oxidation of the silicon particles may be induced.

Also, a process of forming a conductive layer on the silicon-based active material composite may be further performed (S30). A solution in which a conductive material is distributed together with a binder in an appropriate solvent is manufactured, and then, the silicon-based active material composite is dispersed in the solution to be obtained and dried, and then, the conductive layer is provided. Alternatively, polyacrylonitrile (PAN), polyethylene (PE), or a polymeric precursor material such as polyacrylic acid (PAA) and polyvinylpyrrolidone (PVP) is dissolved in an appropriate solvent, and after that, the silicon-based active material composite is dispersed in the solvent to obtain intermediate particles wet by the polymeric precursor material. Then, the intermediate particles are dried and treated at a low temperature to obtain the conductive layer.

While the inventive concept has been particularly shown and described with reference to exemplary embodiments thereof, it will be understood that various changes in form and details may be made therein without departing from the spirit and scope of the following claims.

The invention claimed is:

1. A secondary particle comprising agglomerated primary particles and a carbon-based conductive material for electrically connecting the agglomerated primary particles,
   wherein an average diameter of the primary particles is 30 to 300 nm,
   wherein each of the primary particles comprises a silicon core and a shell of silicon oxide surrounding the core, and
   wherein the amount of oxygen in the primary particles with respect to the total weight of the silicon and the silicon oxide in the primary particles is 9 to 20 wt %.

2. The secondary particle of claim 1, wherein the average diameter of the primary particles is 30 to 200 nm.

3. The secondary particle of claim 1, wherein the shell of silicon oxide has a thickness of 2 to 30 nm.

4. The secondary particle of claim 1, wherein the shell of silicon oxide has a thickness of 3 to 15 nm.

5. The secondary particle of claim 1, wherein the amount of oxygen in the primary particles with respect to the total weight of the silicon and the silicon oxide in the primary particles is 10 to 20 wt %.

6. The secondary particle of claim 1, wherein the silicon oxide shell is formed on the silicon core of each of the primary particles by chemically oxidizing silicon particles by grinding a slurry of the silicon particles in a liquid solvent comprising oxygen.

7. The secondary particle of claim 1, wherein the carbon-based conductive material is formed by dispersing the primary particles in a solvent comprising a polymeric precursor of the carbon-based conductive material to obtain intermediate particles wet by the polymeric precursor, drying the intermediate particles, and heat treating to obtain the carbon-based conductive material.

8. The secondary particle of claim 1, wherein the carbon-based conductive material is formed of crystalline carbon, soft carbon, graphite, graphene, or amorphous carbon.

9. The secondary particle of claim 1, wherein the carbon-based conductive material has a greater mole fraction of $sp^2$ carbon than $sp^3$ carbon.

10. The secondary particle of claim 1, wherein the carbon-based conductive material is a layer at the outermost portion of the primary particles.

11. The secondary particle of claim 10, wherein the carbon-based conductive material is formed of crystalline carbon, soft carbon, graphite, graphene, or amorphous carbon.

12. The secondary particle of claim 11, wherein the carbon-based conductive material has a greater mole fraction of $sp^2$ carbon than $sp^3$ carbon.

* * * * *